(12) United States Patent
Keiller

(10) Patent No.: US 6,411,925 B1
(45) Date of Patent: *Jun. 25, 2002

(54) SPEECH PROCESSING APPARATUS AND METHOD FOR NOISE MASKING

(75) Inventor: Robert Alexander Keiller, Guildford (GB)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/409,250

(22) Filed: Sep. 30, 1999

(30) Foreign Application Priority Data

Oct. 20, 1998 (GB) .............................................. 9822930

(51) Int. Cl.[7] .......................... G10L 11/06; G10L 19/02; G10L 15/06; G10L 15/10
(52) U.S. Cl. ....................... 704/200; 704/201; 704/230; 704/243; 704/236
(58) Field of Search ................................. 704/200, 204, 704/205, 233, 236, 224, 241

(56) References Cited

U.S. PATENT DOCUMENTS

| 4,087,630 A | * | 5/1978 | Browning et al. ........... 704/236 |
| 4,805,193 A | * | 2/1989 | McLaughlin et al. ........ 704/205 |
| 4,827,516 A | * | 5/1989 | Tsukahara et al. .......... 704/224 |
| 4,918,732 A | | 4/1990 | Gerson et al. ................. 381/43 |
| 5,621,854 A | * | 4/1997 | Hollier ......................... 704/233 |
| 5,832,424 A | * | 11/1998 | Tsutsui ........................ 704/204 |
| 5,960,395 A | * | 9/1999 | Tzirkel-Hancock ......... 704/241 |

FOREIGN PATENT DOCUMENTS

EP      0 789 349      8/1997

OTHER PUBLICATIONS

McEachern, Robert ("How the Ear Really Works," IEEE–SP International Symposium, Time–Frequency and Time–Scale Analysis, Oct. 1992).*

* cited by examiner

Primary Examiner—Richemond Dorvil
Assistant Examiner—Daniel A. Nolan
(74) Attorney, Agent, or Firm—Fitzpatrick, Cella, Harper & Scinto

(57) ABSTRACT

A speech processing apparatus is provided in which the distribution of energy with frequency within each frame of an input speech signal is determined and any energy components which are less than a masking level determined relative to the maximum energy within the frame are made equal to the masking level.

29 Claims, 14 Drawing Sheets

SPEECH PROCESSING APPARATUS AND METHOD FOR NOISE MASKING

The present invention relates to a speech processing apparatus and method. The invention has particular, although not exclusive relevance to the checking of training examples to ensure that they are consistent.

Speech recognition and speech verification systems both require stored models which are representative of the speech or the speaker to be recognised. These models are generated by the user inputting one or more training utterances. In order to reduce recognition or verification errors, the training utterances should be consistent.

One aim of the present invention is to provide a system for checking that training examples are consistent, in order to reduce mismatches during use.

According to one aspect, the present invention provides a consistency checking apparatus, for checking the consistency between a first sequence of frames representative of a first signal and a second sequence of frames representative of a second signal using a matching score and the results of a matching process performed on One aim of the present invention is to provide an alternative technique for performing such a noise masking operation on the input speech signals.

According to one aspect, the present invention provides a speech processing apparatus comprising means for receiving a sequence of time frames representative of a speech signal; means for determining the distribution of energy with frequency within each of said time frames; and means for processing each frame energy distribution by: (i) determining the maximum energy level within the current frame; (ii) determining a maximum level for the current frame by subtracting a predetermined energy level from the maximum energy level; and (iii) making any energy components which are less than said masking level equal to said masking level.

An exemplary embodiment of the invention will now be described with reference to the accompanying drawings in which.

Figure 18A:
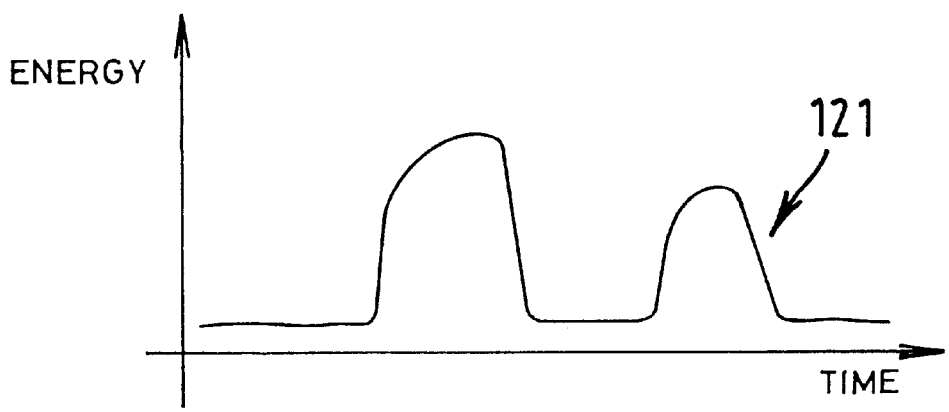
Figure 18B:
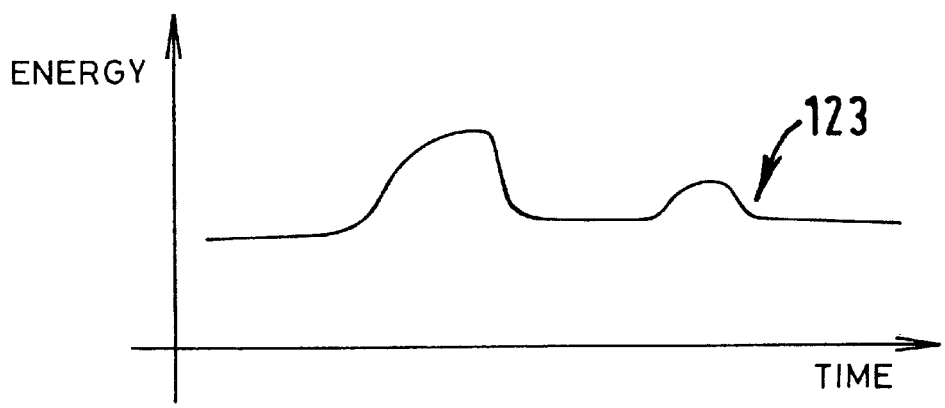
Figure 18C:
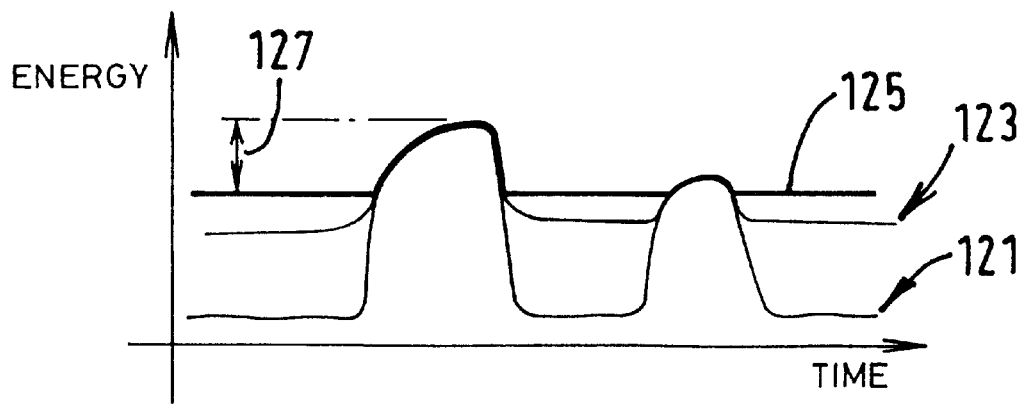
Figure 19A:
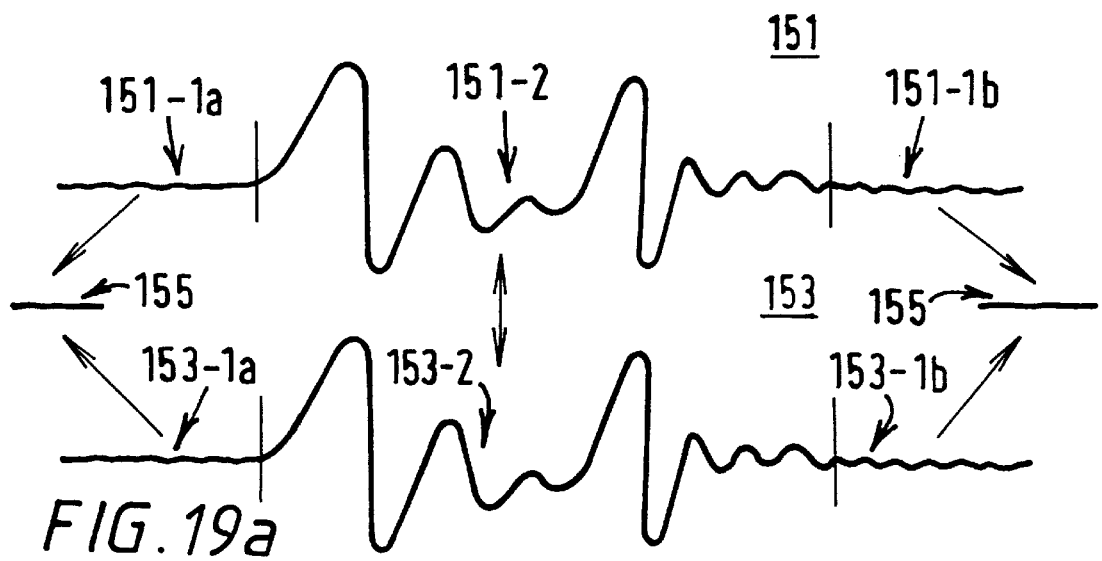
Figure 19B:
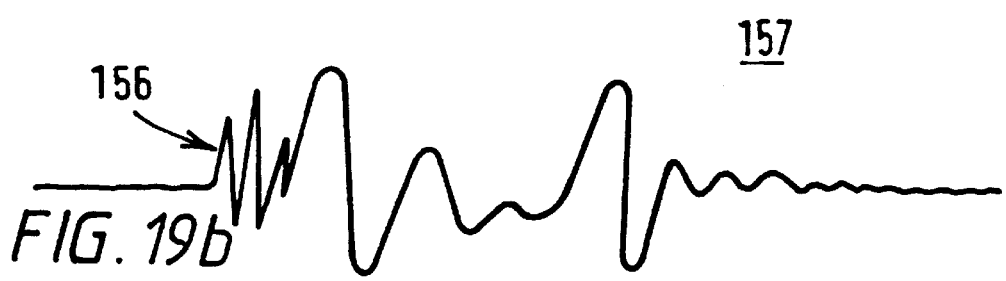
Figure 19C:
Figure 19D:
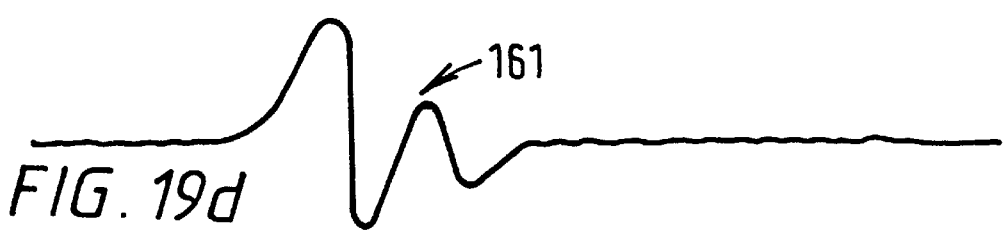
Figure 19E:
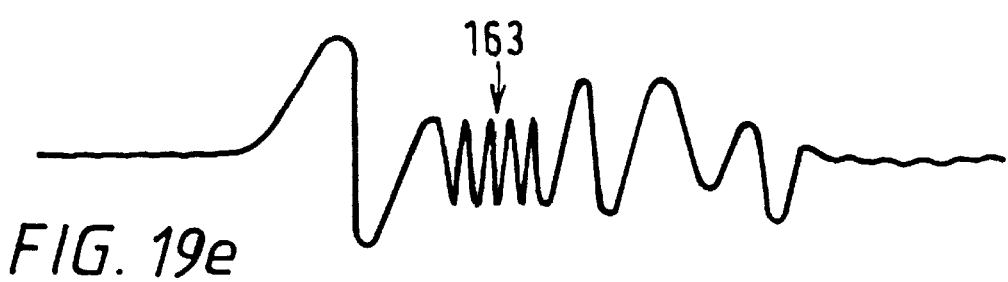

FIG. 18a schematically shows the way in which the energy level varies during the utterance of an example word in which there is little background noise;

FIG. 18b schematically shows the way in which the energy level varies in the utterance of the same word, when the utterance is quieter and when there is more background noise;

FIG. 18c schematically shows the energy levels shown in FIGS. 18a and 18b after energy normalization and energy masking;

FIG. 19a schematically shows two utterances of the same word which are used to generate a word model;

FIG. 19b schematically shows an utterance of a training example having large oscillations at the beginning of the utterance caused by the user breathing into the microphone;

FIG. 19c schematically illustrates an utterance of a training word which is different to the training words shown in FIG. 19a;

FIG. 19d schematically shows an utterance of a training word in which part of the word has been cut off; and FIG. 19e schematically shows an utterance of a training word having a large amount of noise within a speech portion thereof.

Embodiments of the present invention can be implemented in computer hardware, but the embodiment to be described is implemented in software which is run in conjunction with processing hardware such as a personal computer, workstation, photocopier, facsimile machine or the like.

Figure 1:
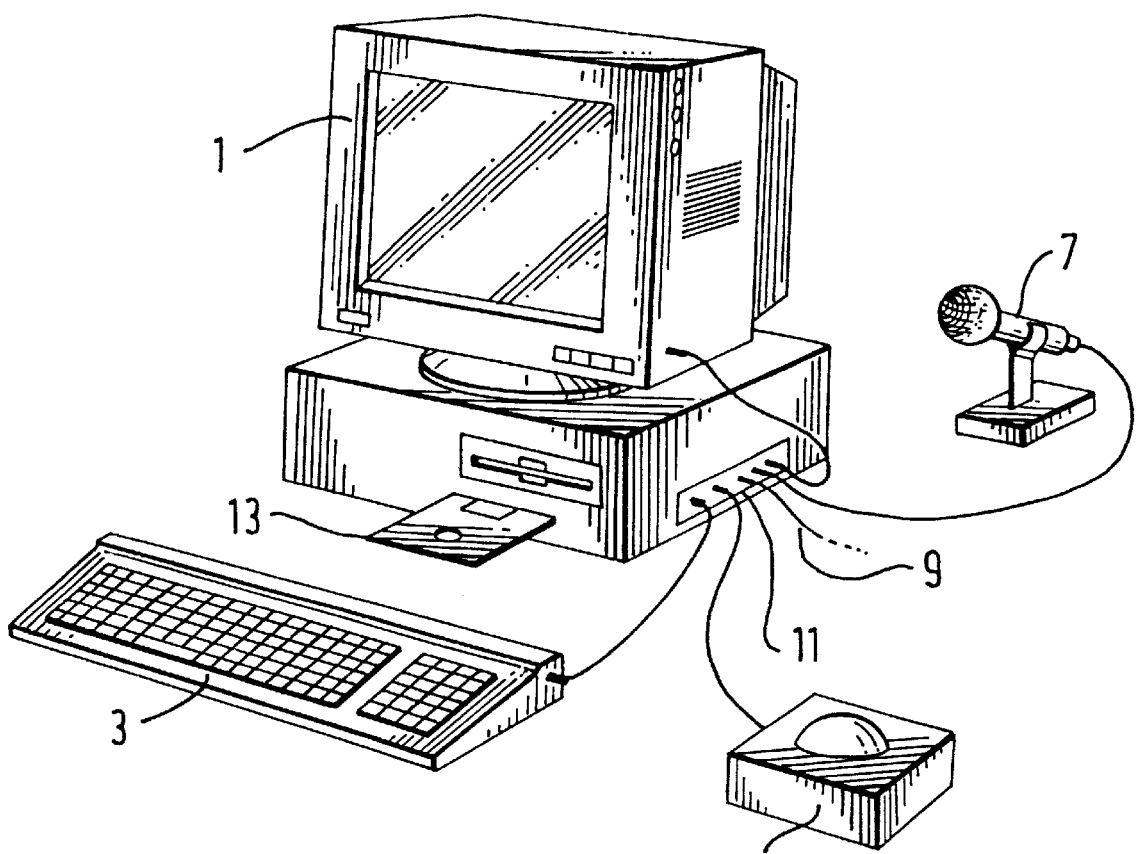
FIG. 1 is a schematic view of a computer which may be programmed to operate an embodiment of the present invention.

FIG. 1 shows a personal computer (PC) 1 which may be programmed to operate an embodiment of the present invention. A keyboard 3, a pointing device 5, a microphone 7 and a telephone line 9 are connected to the PC 1 via an interface 11. The keyboard 3 and pointing device 5 enable the system to be controlled by a user. The microphone 7 converts the acoustic speech signal of the user into an equivalent electrical signal and supplies this to the PC 1 for processing. An internal modem and speech receiving circuit (not shown) may be connected to the telephone line 9 so that the PC 1 can communicate with, for example, a remote computer or with a remote user.

The programme instructions which make the PC 1 operate in accordance with the present invention may be supplied for use with an existing PC 1 on, for example a storage device such as a magnetic disc 13, or by downloading the software from the internet (not shown) via the internal modem and the telephone line 9.

Figure 2:
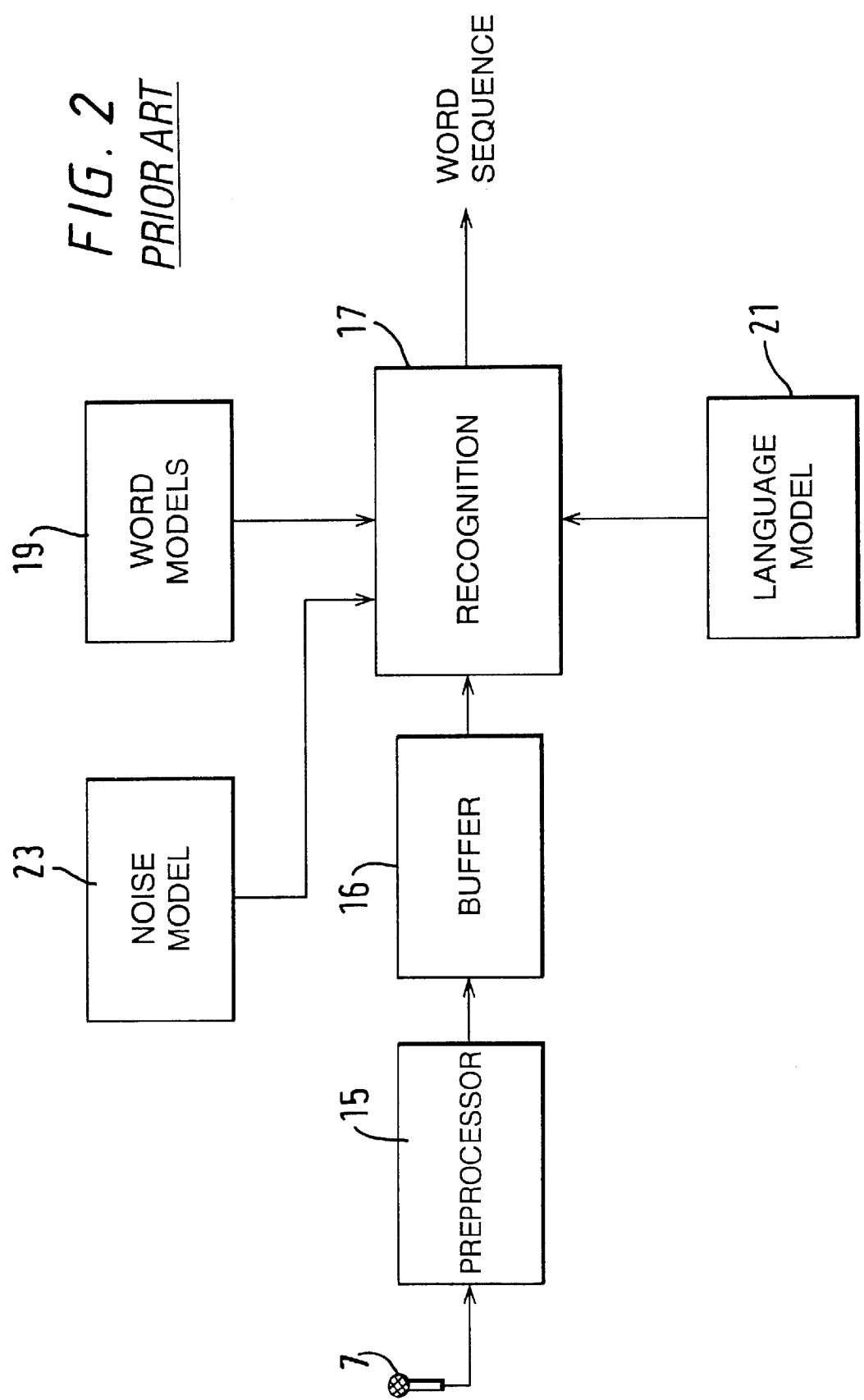
FIG. 2 is a schematic overview of a speech recognition system.

The operation of the speech recognition system of this embodiment will now be briefly described with reference to FIG. 2. A more detailed description of the speech recognition system can be found in the Applicant's earlier European patent application EP 0789349, the content of which is hereby incorporated by reference. Electrical signals representative of the input speech from, for example, the microphone 7 are applied to a preprocessor 15 which converts the input speech signal into a sequence of parameter frames, each representing a corresponding time frame of the input speech signal. The sequence of parameter frames are supplied, via buffer 16, to a recognition block 17 where the speech is recognised by comparing the input sequence of parameter frames with reference models or word models 19, each model comprising a sequence of parameter frames expressed in the same kind of parameters as those of the input speech to be recognised.

A language model 21 and a noise model 23 are also provided as inputs to the recognition block 17 to aid in the recognition process. The noise model is representative of silence or background noise and, in this embodiment, comprises a single parameter frame of the same type as those of the input speech signal to be recognised. The language model 21 is used to constrain the allowed sequence of words output from the recognition block 17 so as to conform with sequences of words known to the system. The word sequence output from the recognition block 17 may then be transcribed for use in, for example, a word processing package or can be used as operator commands to initiate, stop or modify the action of the PC 1.

A more detailed explanation will now be given of some of the apparatus blocks described above.

PREPROCESSOR

The preprocessor will now be described with reference to FIGS. 3 to 17.

The functions of the preprocessor 15 are to extract the information required from the speech and to reduce the amount of data that has to be processed. There are many different types of information which can be extracted from the input signal. In this embodiment the preprocessor 15 is designed to extract "formant" related information. Formants are defined as being the resonant frequencies of the vocal tract of the user, which change as the shape of the vocal tract changes.

Figure 3:
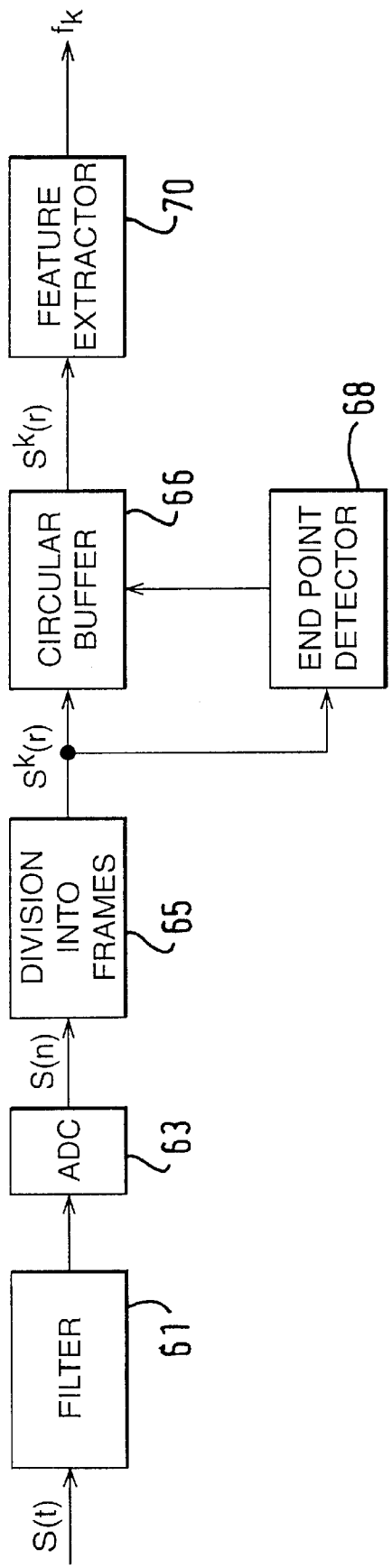
FIG. 3 is a block diagram of the preprocessor incorporated as part of the system shown in FIG. 2, which illustrates some of the processing steps that are performed on the input speech signal.

FIG. 3 shows a block diagram of some of the preprocessing that is performed on the input speech signal. Input speech S(t) from the microphone 7 or the telephone line 9 is supplied to filter block 61, which removes frequencies within the input speech signal that contain little meaningful information. Most of the information useful for speech recognition is contained in the frequency band between 300 Hz and 4 KHz. Therefore, filter block 61 removes all frequencies outside this frequency band. Since no information which is useful for speech recognition is filtered out by the filter block 61, there is no loss of recognition performance. Further, in some environments, for example in a motor vehicle, most of the background noise is below 300 Hz and the filter block 61 can result in an effective increase in signal-to-noise ratio of approximately 10 dB or more. The filtered speech signal is then converted into 16 bit digital samples by the analogue-to-digital converter (ADC) 63. To adhere to the Nyquist sampling criterion, ADC 63 samples the filtered signal at a rate of 8000 times per second. In this embodiment, the whole input speech utterance is converted into digital samples and stored in a buffer (not shown), prior to the subsequent steps in the processing of the speech signals.

After the input speech has been sampled it is divided into non-overlapping equal length frames in block 65. The reason for this division of the input speech into frames will now be described in more detail. As mentioned above, during continuous speech the formant related information changes continuously, the rate of change being directly related to the rate of movement of the speech articulators which is limited by physiological constraints. Therefore, in order to track the changing formant frequencies, the speech signal must be analysed over short time periods or frames, this method being known in the art of speech analysis as a "short time" analysis of speech. There are two considerations that have to be addressed when performing a short time analysis: (i) what rate should the time frames be extracted from the speech signal, and (ii) how large a time frame should be used.

The first consideration depends on the rate of movement of the speech articulators i.e. the frames should be sufficiently close to ensure that important events are not missed and to ensure that there is reasonable continuity. The second consideration is determined by a compromise between the time frame being short enough so that the speech signal's properties during the frame are constant, and the frame being long enough to give sufficient frequency detail so that the formants can be distinguished.

Figure 4:
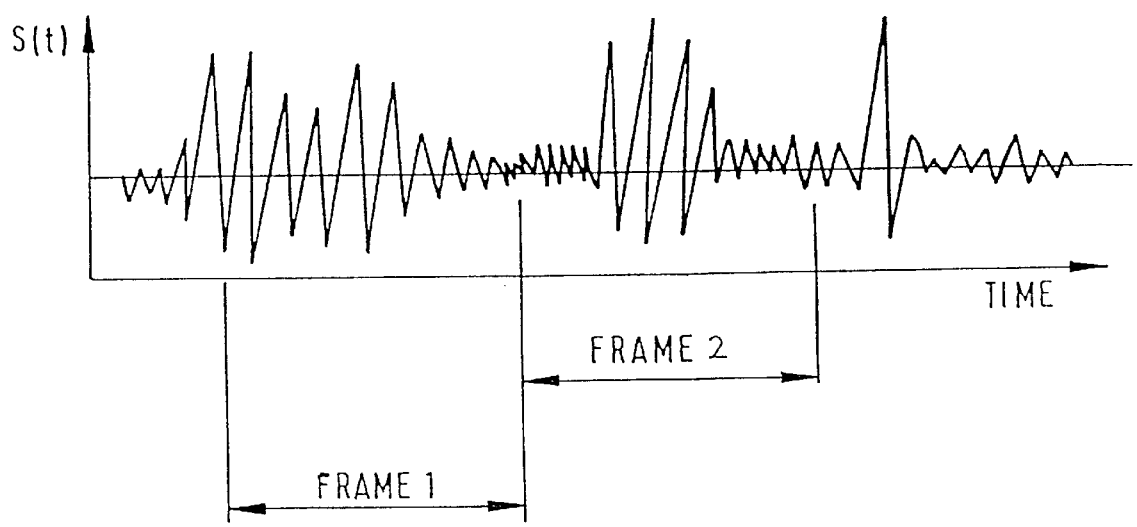
FIG. 4 is a diagrammatical representation of the division of the input speech signal S(t) into a series of time frames.
Figure 5:
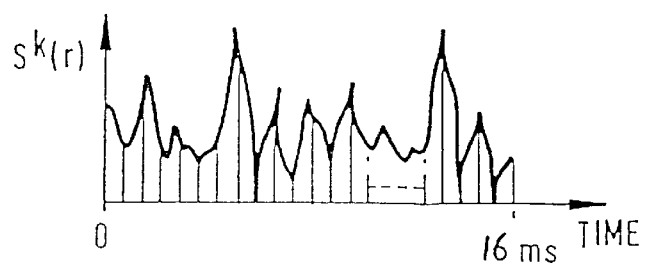
FIG. 5 is a diagrammatical representation of a typical speech signal for a single time frame.

In this embodiment, in order to reduce the amount of computation required, both in the front end processing and later in the recognition stage, non-overlapping frames of 128 samples (corresponding to 16 milliseconds of speech) are directly extracted from the speech without a conventional windowing function. This is illustrated in FIGS. 4 and 5, which show a portion of an input signal S(t) and the division of the signal into non-overlapping frames and one of these frames $S^k(r)$, respectively. In a conventional system, overlapping frames are usually extracted using a window function which reduces frequency distortions caused by extracting the frames from the speech signal. The applicant has found, however, that with non-overlapping frames, these conventional windowing functions worsen rather than improve recognition performance.

The speech frames $S^k(r)$ output by the block 65 are then written into a circular buffer 66 which can store 62 frames corresponding to approximately one second of speech. The frames written in the circular buffer 66 are also passed to an endpoint detector 68 which process the frames to identify when the speech in the input signal begins, and after it has begun, when it ends. Until speech is detected within the input signal, the frames in the circular buffer are not fed to the computationally intensive feature extractor 70. However, when the endpoint detector 68 detects the beginning of speech within the input signal, it signals the circular buffer to start passing the frames received after the start of speech point to the feature extractor 70 which then extracts a set of parameters for each frame representative of the speech signal within the frame.

SPEECH DETECTION

The way in which the endpoint detector 68 operates in this embodiment, will now be described with reference to FIGS. 6 to 9. In this embodiment, speech is detected by treating the average frame energy of the input signal as a sampled signal and looking for modulations within that sampled signal that are characteristic of speech. In particular, the energy due to speech is strongly modulated at frequencies around 4 Hz, with very little modulation below 1 Hz or above 10 Hz. In contrast, changes in noise level tend to occur relatively slowly, typically modulating the signal energy at less than 1 Hz. In addition, random fluctuations in the noise energy are uncorrelated from frame to frame and are spread over the modulation frequency range from 0 Hz to half the frame rate. Therefore, in this embodiment, the endpoint detector 68 is arranged to detect the presence of speech by band-pass filtering the average frame energy in a frequency band between 2 Hz and 6 Hz, by calculating the modulation power within this frequency band and by applying a detection threshold to the calculated modulation power.

Figure 6A:
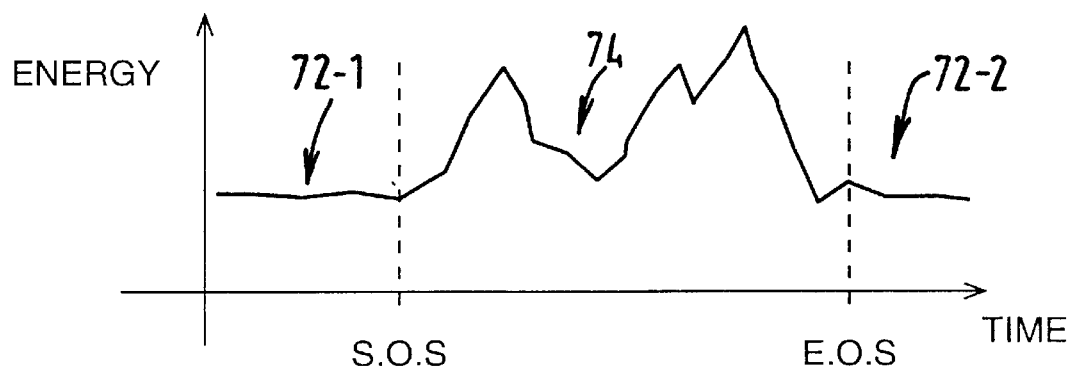
FIG. 6a is a plot of the average frame energy of an input speech signal, illustrating the way in which the average energy changes at the beginning and end of speech within the input signal.
Figure 6B:
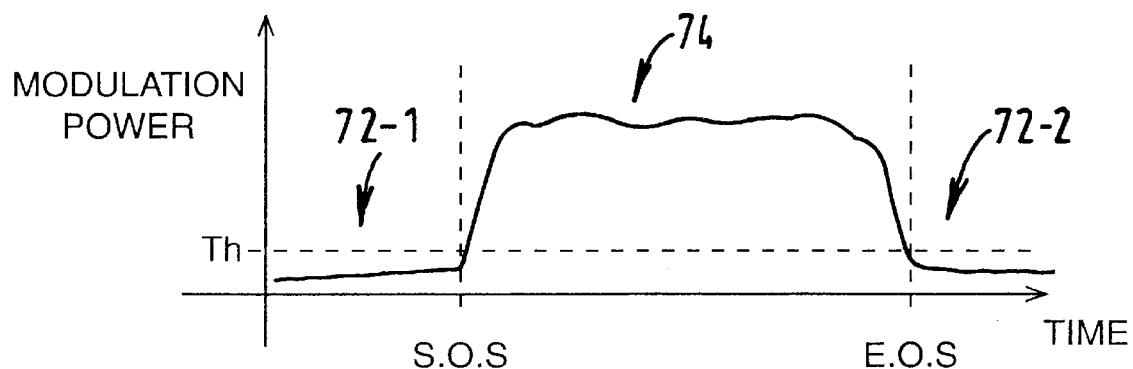
FIG. 6b is a plot of the modulation power of the energy signal shown in FIG. 6a within a frequency band centered around 4Hz.

FIG. 6a is a plot illustrating the average frame energy within an example input signal. The input signal comprises background noise portions 72-1 and 72-2 which correspond to background noise and which bound a speech containing portion 74. As shown in FIG. 6a, the average energy during the background noise portions does not fluctuate much with time. In contrast, in the speech containing portion 74 the average frame energy fluctuates considerably with time and has a larger mean value.

As mentioned above, the prior art endpoint detectors simply threshold the signal shown in FIG. 6a in order to determine the start of speech point (SOS) and the end of speech point (EOS). However, in order to determine these points accurately, the threshold value must be set near the noise level. As those skilled in the art will appreciate, in conditions where there is high noise levels or where the noise level changes continuously, this can cause errors in the detection of the start and end points of speech.

As mentioned above, in this embodiment, the energy signal shown in FIG. 6a is bandpass filtered by a band-pass filter having cut-off frequencies of 2 Hz and 6 Hz and having a peak response at about 4 Hz. The modulation power of the bandpass filtered signal is then determined and this is plotted in FIG. 6b for the energy signal shown in FIG. 6a. As shown, this modulation power in regions 72-1 and 72-2 are relatively small compared with the modulation power during the speech portion 74. This will be the same regardless of the amount of energy within the background noise. Therefore, by comparing this bandpass modulation power for each frame with a fixed detection threshold Th, the start of speech (SOS) and the end of speech (EOS) can be detected more accurately than the conventional approach described above especially in noisy environments.

Figure 7:
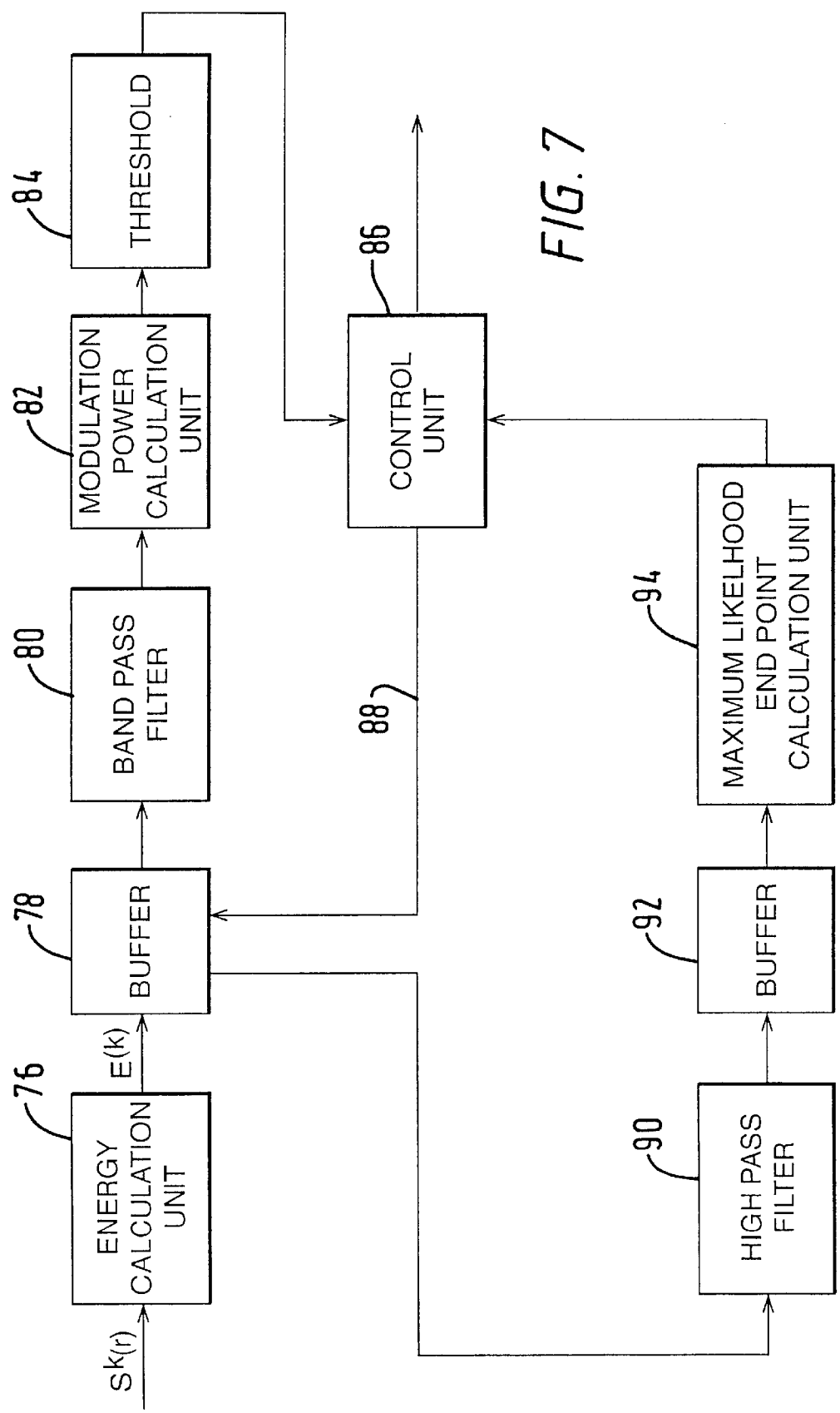
FIG. 7 is a block diagram showing in more detail, the end point detector shown in FIG. 3.

The way in which this is actually performed in this embodiment will now be described in more detail. FIG. 7 is a block diagram showing the components of the endpoint detector 68 shown in FIG. 3. As shown, the endpoint detector 68 has a energy calculation unit 76 which continuously receives the frames $S^k(r)$ output by the block 65 and which continuously calculates and outputs to buffer 78 the average energy E(k) of the signal within each received frame. As each new average energy value is calculated and input into the buffer 78, a sequence of energy values defined by a sliding window of fixed size and ending at the energy value for the last received frame, is filtered by the bandpass filter 80 and the modulation power calculation unit 82 calculates the modulation power of the filtered sequence. In this embodiment, the bandpass filtering and the power calculation are combined by computing the first non-DC coefficient of a discrete Fourier transform of the average energy in the sliding window. In particular, the bandpass modulation power, $w_k$, for frame k, is given by:

$$w_k = \left| \sum_{n=0}^{N-1} e_{k-n} \exp\left(i 2\pi \frac{n}{N}\right) \right|^2 \tag{1}$$

where $e_i$ is the average frame energy for frame i calculated by block 76 and N is the number of frames in the window. In this embodiment N is set to 16 which corresponds to a bandpass filter with peak response at about 4 Hz. The value of $w_k$ for each frame is then compared with a detection threshold Th in a threshold circuit 84 which outputs a control signal to the control unit 86 identifying whether or not the bandpass modulation power for the current frame is above or below the detection threshold. Depending on the application, the control unit 86 could cause the feature extractor 70 to commence processing of the input signal as soon as the threshold circuit 84 detects that the bandpass modulation power $w_k$ exceeds the detection threshold Th. However, in this embodiment, a more accurate determination of the start of speech and of the end of speech is performed in order to ensure there is minimum processing of background signals by the feature extractor 70, to reduce recognition errors caused by the noise and to improve recognition performance. In this embodiment this is achieved, using a maximum likelihood calculation which is calculated when the control unit 86 identifies that the bandpass modulation power, $w_k$, exceeds the detection threshold Th for a predetermined number of frames.

Figure 8A:
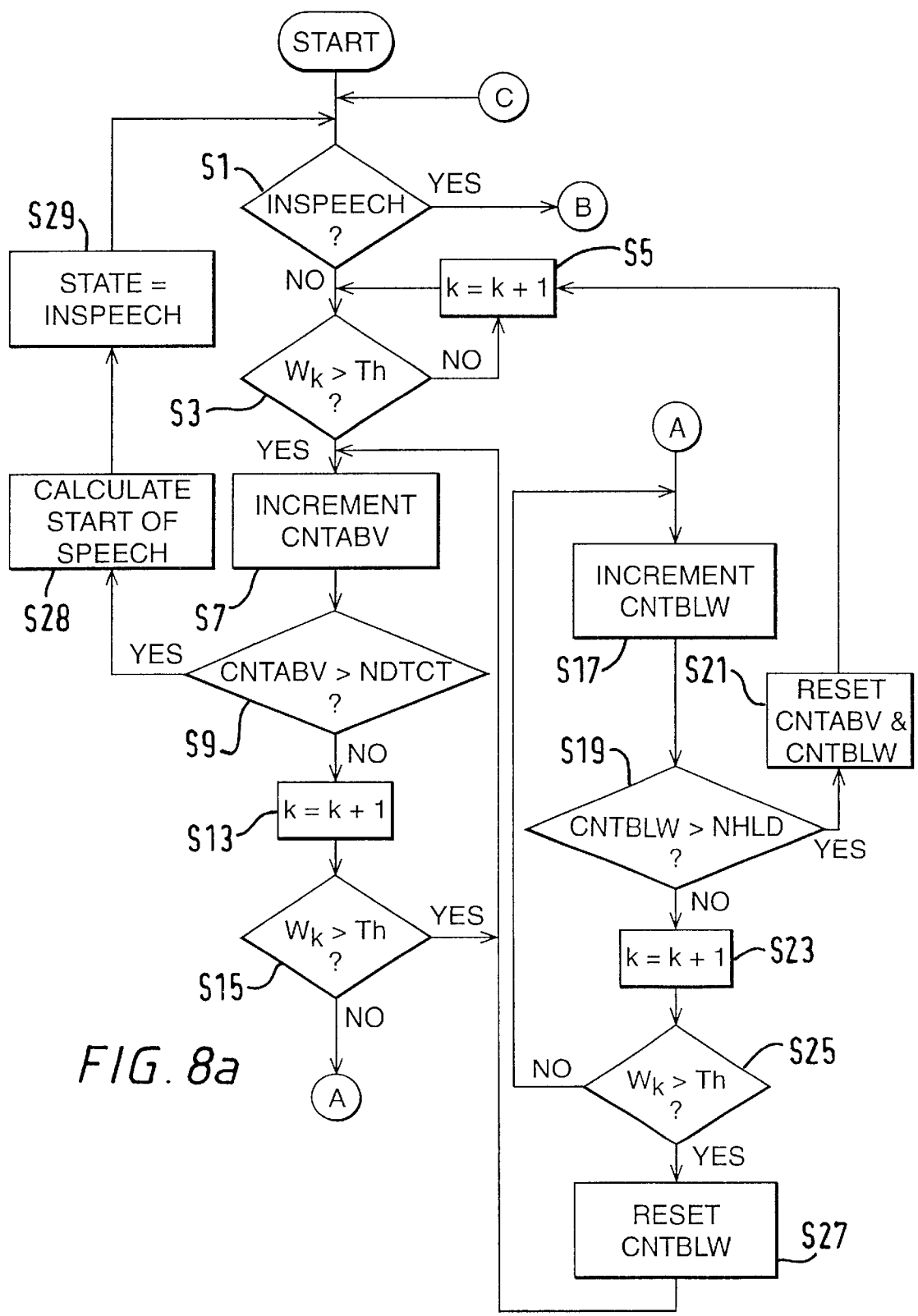
FIG. 8a is a flow chart which illustrates part of the steps taken by the control unit shown in FIG. 7.
Figure 8B:
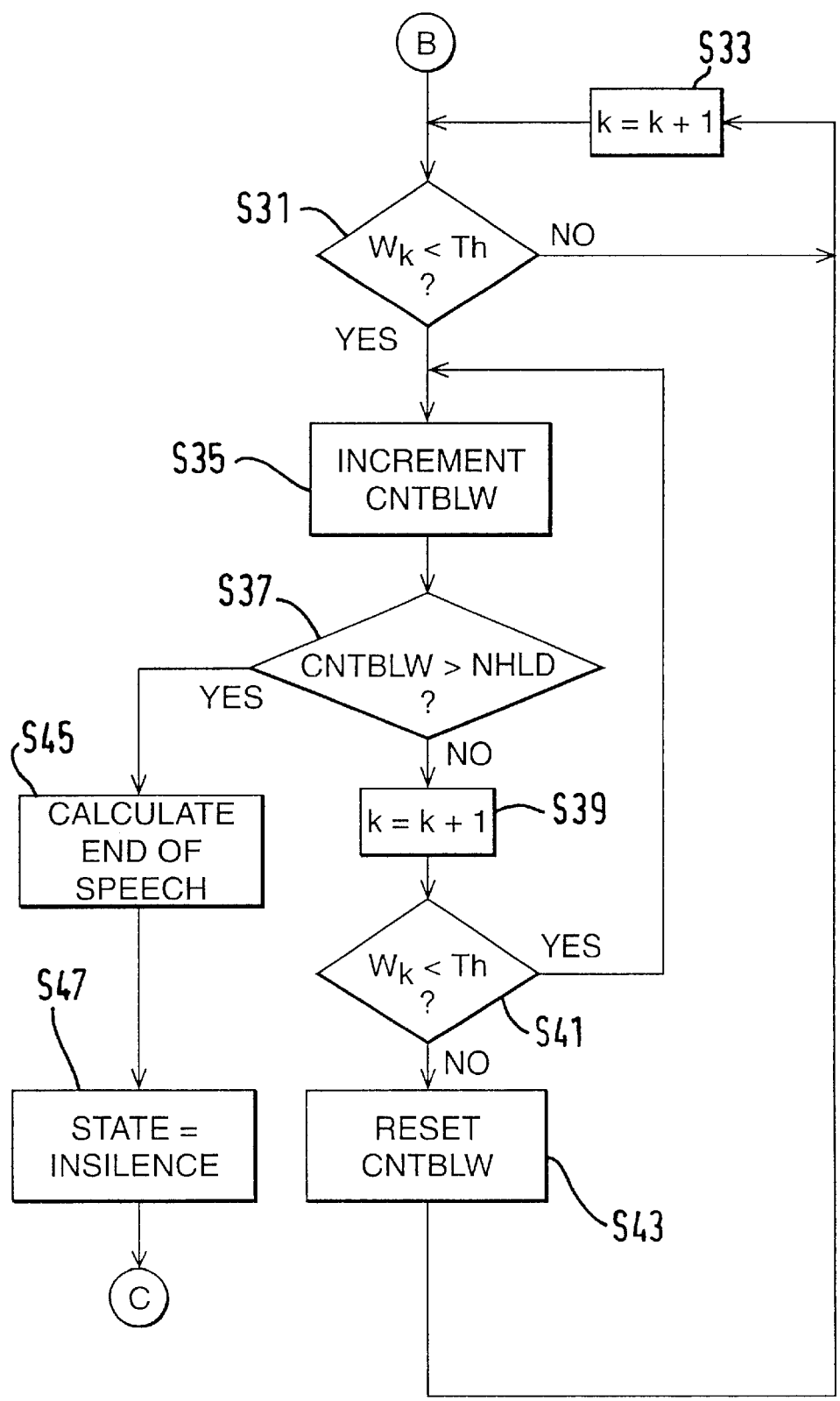
FIG. 8b is a flow chart which illustrates the remaining steps taken by the control unit shown in FIG. 7.

FIG. 8 shows the control steps performed by the control unit 86 in deciding when to perform the maximum likelihood calculation. In this embodiment, the control unit 86 has two states, an INSPEECH state and an INSILENCE state. When the control unit 86 is in the INSILENCE state, it searches for the beginning of speech and when it is in the INSPEECH state, it searches for the end of speech. As shown in FIG. 8a, in step S1, the control unit 86 determines if it is in the INSPEECH state. If it is not, then processing proceeds to step S3 where the control unit 86 determines if the bandpass modulation power $w_k$ for the current frame k is greater than the detection threshold Th, from the signal received by the threshold circuit 84. If it is not, then processing proceeds to step S5 where k is incremented and the same procedure is carried out again for the next frame. If the bandpass modulation power $w_k$ is greater than the detection threshold Th, then the processing proceeds from step S3 to step S7 where a count [CNTABV] associated with the number of frames above the detection threshold Th is incremented. This count CNTABV is then compared with a predefined number NDTCT (which indicates that speech has started) in step S9. In this embodiment NDTCT is 18, which corresponds to 288 milliseconds of input speech.

If the number of frames above the threshold i.e. CNTABV, is not greater than the predetermined number NDTCT, then the frame number k is incremented in step S13 and in step S15, the control unit 86 determines if the bandpass modulation power $w_k$ for the next frame is above the detection threshold Th. If it is, then the processing returns to step S7 where the count CNTABV of the number of frames above the threshold is incremented. If the bandpass modulation power $w_k$ is less than the threshold at step S15, then processing proceeds to step S17, where the count (CNTBLW) of the number of consecutive frames below the threshold is incremented. Subsequently, in step S19, the count CNTBLW of the number of consecutive frames below the threshold is compared with a predetermined number NHLD (indicating that the control unit 86 should stop counting and wait for the threshold to be exceeded again). In this embodiment, NHLD is 6, which corresponds to 96 milliseconds of input signal.

If the count CNTBLW is greater than the predetermined number NHLD, then both the counts CNTABV and CNTBLW are reset in step S21 and the processing returns to step S5 where the control unit 86 waits, through the action of steps S3 and S5, for the next frame which is above the detection threshold Th. If at step S19, the number of consecutive frames which are below the threshold is not greater than the predetermined number NHLD, then processing proceeds to step S23 where the frame number k is incremented. In step S25, the control unit 86 then determines if the bandpass modulation power $w_k$ for the next frame is above the detection threshold Th. If it is not, then the processing returns to step S17, where the count CNTBL of the number of consecutive frames below the threshold is incremented. If, on the other hand the control unit 86 determines, in step S25, that the bandpass modulation power $w_k$ for the next frame is above the detection threshold Th, then the processing passes from step S25 to step S27, where the number of frames which are below the detection threshold is reset to zero and the processing returns to step S7, where the number of frames which are above the detection threshold is incremented. Once the count CNTABV is above NDTCT, indicating speech has started, then the processing proceeds from step S9 to step S28, where the control unit 86 initiates the calculation of the start of speech point using a maximum likelihood calculation on recent frames. The state of the control unit 86 is then changed to be INSPEECH in step S29 and the processing returns to step S1.

Therefore, to summarise, when the control unit 86 is in the state INSILENCE and when the bandpass modulation power first exceeds the detection threshold Th, the control unit 86 starts counting the number of frames above the threshold and the number of consecutive frames below the threshold. If the number of consecutive frames below the threshold exceeds NHLD, the algorithm stops counting and waits for the threshold to be exceeded again. If this does not happen before the count CNTABV of the number of frames above the threshold exceeds NDTCT, then the state is changed to INSPEECH and the start point is calculated using recent frames. Full processing of the data by the feature extractor 70 can then begin after the start of speech has been calculated.

Once the start of speech has been determined, the control unit 86 is programmed to look for the end of speech. In particular, referring to FIG. 8a again, at step S1, after the start of speech has been calculated in step S28 and the state of the controller has been set to INSPEECH, the processing will pass from step S1 to step S31 shown in FIG. 8b, where the control unit 86 checks to see if the bandpass modulation power $w_k$ for the current frame k is below the detection threshold Th. If $w_k$ is above the detection threshold, then the processing loops to step S33 where the frame counter k is incremented and the control unit checks the bandpass modulation power of the next frame. When the control unit 86 identifies a frame having a bandpass modulation power below the threshold, the processing proceeds to step S35, where the count CNTBLW of the number of consecutive frames below the threshold is incremented. Processing then proceeds to step S37 where the control unit 86 checks if the number of consecutive frames below the threshold exceeds a predetermined number NEND, which indicates that the speech has ended. In this embodiment, NEND is 14, corresponding to 224 milliseconds.

If the number of consecutive frames is less than NEND, then speech has not ended and the processing proceeds to step S39, where the frame counter k is incremented. Processing then proceeds to step S41 where the control unit 86 determines if the bandpass modulation power for the next frame is below the detection threshold Th. If it is not, then the count CNTBLW of the number of consecutive frames below the detection threshold is reset in step S43 and processing returns to step S33. If at step S41, the bandpass modulation power is still below the detection threshold, then the processing returns to step S35, where the count of the number of consecutive frames below the threshold is incremented. Once the number of consecutive frames below the threshold has exceeded NEND, the processing proceeds to step S45, where the control unit 86 initiates the calculation of the endpoint of speech using a maximum likelihood calculation with recent frames. The state of the control unit 86 is then changed to INSILENCE in step S47 and the processing returns to step S1.

Therefore, in summary, after the beginning of speech has been determined, the control unit 86 continuously looks for the end of speech. This is done by the control unit 86 counting the number of consecutive frames below the detection threshold and when this number exceeds a predetermined number, NEND, the control unit 86 changes state to INSILENCE and the end of speech is calculated.

MAXIMUM LIKELIHOOD END-POINT DETECTION

As mentioned above, the beginning and end points of the speech within the input signal are calculated using a maximum likelihood method. In particular, the likelihood for an end point occurring at a particular frame is calculated and the frame with the largest likelihood is chosen as the end point. Again, the average signal energy per frame is used in the likelihood calculation and a simple model for this parameter is assumed.

Figure 9:
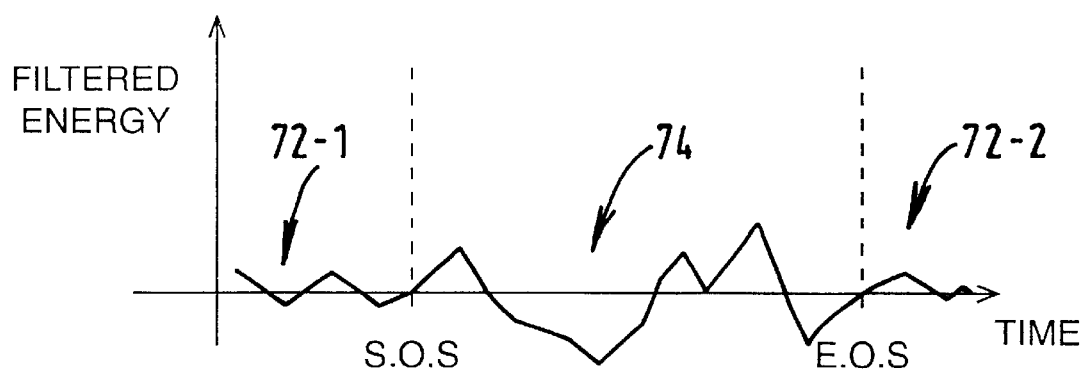
FIG. 9 is a plot of the average energy shown in FIG. 6a after being filtered to remove low frequency variations and the DC offset.

Referring to FIG. 7, when the control unit 86 identifies that speech has started, it outputs a control signal on line 88 to the buffer 78 which causes the N most recent frame energies to be read out of the buffer 78 and input to a high pass filter 90. The filter 90 removes the DC offset and any slowly varying noise contribution in the energy signal and outputs the filtered energies to buffer 92. In this embodiment, the filter 90 is a second order recursive filter, with a cut-off frequency of 1 Hz. FIG. 9 shows the output of the high-pass filter 90 for the energy signal shown in FIG. 6a. As shown, the filtered frame energy fluctuates about zero during the silence portions 72-1 and 72-2 but oscillates during the speech portions 74. As a result, it is assumed that during the silence portions, the filtered frame energies are uncorrelated from frame to frame, whereas in the speech portion, the filtered frame energy of each frame depends upon the filtered frame energy of its neighboring frames.

The maximum likelihood input calculation unit 94 then processes the N filtered energies stored in the buffer 92 by taking each point as a possible starting point (i.e. as being the end point) and treating all frames before this point as noise and all frames after this point as speech and applying each of the designated noise frames into a noise model and each of the designated speech frames into a speech model to give a likelihood score for that point being the end point.

This process is performed for each of the N frames in the buffer 92 and the one that gives the best likelihood score is determined to be the end point.

In this embodiment Laplacian statistics are used to model the noise and speech portions and the likelihood $L_1$ that frames 1 to M in the buffer 92 are silence is given by:

$$L_1 = (2\sigma_1^2)^{-\frac{M}{2}} \exp\left(-\frac{\sqrt{2}}{\sigma_1} \sum_{i=1}^{M} |y_i|\right) \quad (2)$$

where $y_i$ is the high-pass filtered energy and $a_1$ is the silence variance. Similarly, the likelihood $L_2$ that frames M+1 to N are speech is given by:

$$L_1 = (2\sigma_2^2)^{-\frac{(N-M)}{2}} \exp\left(-\frac{\sqrt{2}}{\sigma_2} \sum_{i=M+1}^{N} |y_i - ay_{i-1}|\right) \quad (3)$$

where a first order auto-regressive process with a Laplacian driving term with variance $\sigma_2$ has been used. The parameter a is the prediction co-efficient of the auto-aggressive model and, in this embodiment, a fixed value of 0.8 is used. The Laplacian statistics were found to be more representative of the data than the more usual Gaussian statistics and lead to more robust estimates and require less computation. However, Gaussian statistics can be used. Multiplying the likelihoods $L_1$ and $L_2$ gives the likelihood for a transition from silence to speech at frame M.

The variances $\sigma_1$ and $\sigma_2$ are unknown but values which maximise the likelihood can be calculated from the data by differentiating equations (2) and (3) and finding a which makes the differentials equal to zero. This gives the following expressions for $\sigma_1$ and $\sigma_2$:

$$\sigma_1(M) = \frac{\sqrt{2}}{M} \sum_{i=1}^{M} |y_i| \quad (4)$$

$$\sigma_2(M) = \frac{\sqrt{2}}{(N-M)} \sum_{i=M+1}^{n} |y_i - ay_{i-1}| \quad (5)$$

Substituting these estimates into the likelihood, taking logarithms and neglecting constant terms gives the following log likelihood to be maximised:

$$1(M) = -M \ln\sigma_1(M) - (N-M)\ln\sigma_2(M) \quad (6)$$

This is calculated for each M, and the frame with the largest 1 is then chosen as the end point.

The same algorithm is used to calculate the end of speech (EOS), except that the data is time reversed. Additionally, it is important to ensure that there are enough frames of silence and enough frames of speech included in the window of N frames to allow a reliable end point estimate. This is ensured by dynamically choosing the window size (N) to include a sufficient number of silence and speech frames. This is achieved by taking all the frames since the first time the detection threshold Th is exceeded up until the control unit decides that speech has started, together with the 16 frames which immediately precede the first frame which exceeded the detection threshold.

FEATURE EXTRACTION

Figure 10:
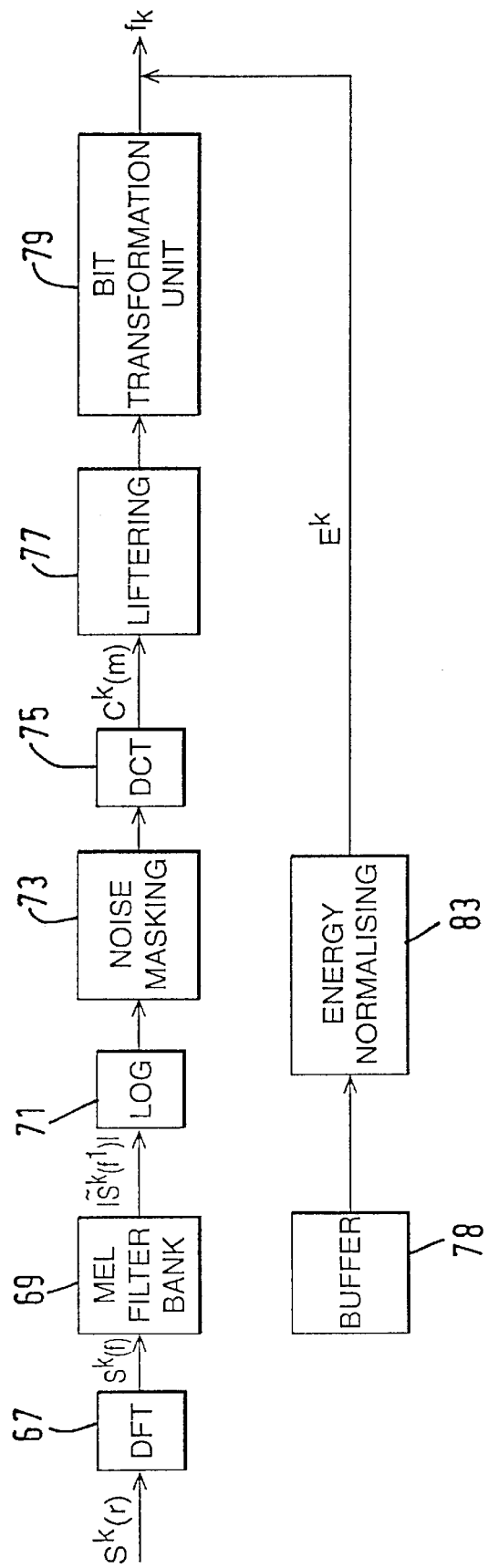
FIG. 10 is a block diagram showing in more detail, the processing performed by the feature extractor shown in FIG. 3.

Once the beginning of speech has been detected, the first speech frame is fed from the circular buffer 66 shown in FIG. 3 to the feature extractor 70. FIG. 10 shows in more detail the components of the feature extractor 70 used in this embodiment. As shown, the first step in the feature extraction is the calculation of the magnitude of the discrete Fourier transform (DFT) of the current frame in block 67, i.e. $|S^k(f)|$ where f is the discrete frequency variable. Only the magnitude information is required, since many aspects of this preprocessor are designed to simulate the operation of the human auditory system, which is relatively insensitive to the phase of the input speech signal.

Figure 11:
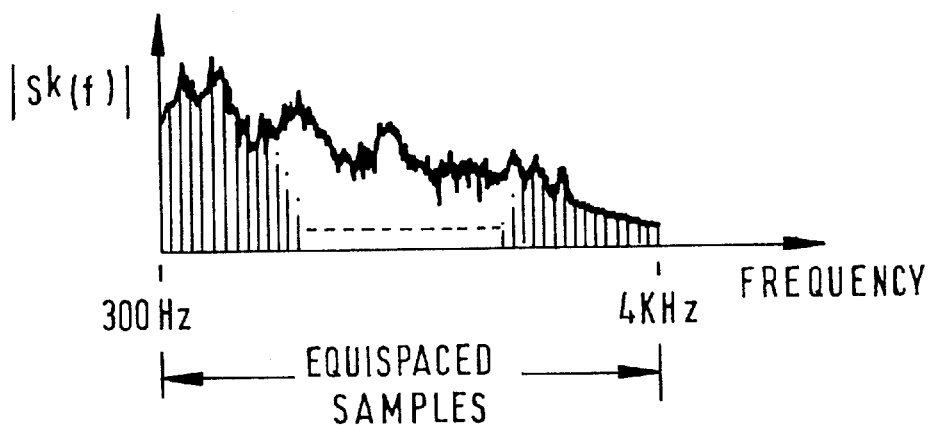
FIG. 11 is a diagrammatical representation of the magnitude response of the discrete Fourier transform of the speech signal shown in FIG. 5.

FIG. 11 shows the magnitude of the DFT $|S^k(f)|$ of the speech signal in frame $S^k(r)$ shown in FIG. 5, the last sample of which occurs at a frequency of half the sampling frequency, i.e. 4 KHz. After performing the DFT, the spectrum is passed through a filter bank which averages the samples within a number of frequency bands. Studies on the human auditory system have shown that the ear frequency resolution decreases with increasing frequency. Therefore, a logarithmically spaced filter bank, i.e. one in which there are more frequency bands in the low frequency region compared to the high frequency region, is preferable to a linearly spaced filter bank since a logarithmically spaced filter bank retains more perceptually meaningful information.

Figure 12:
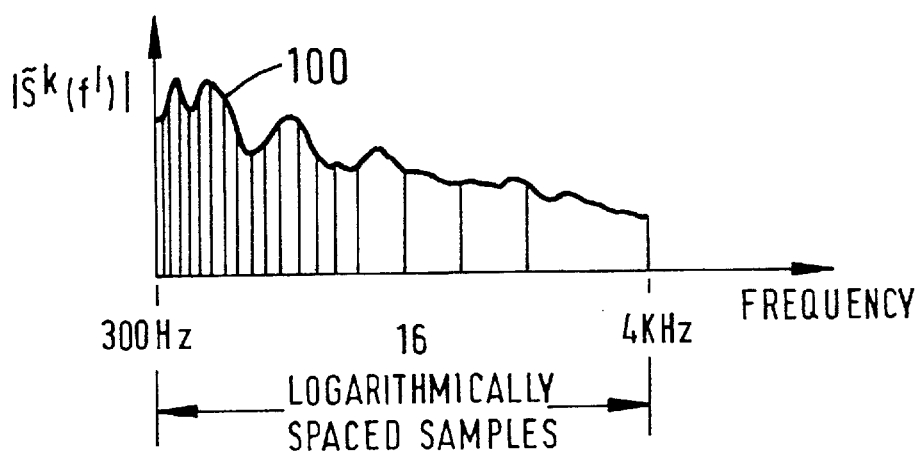
FIG. 12 is a diagrammatical representation of the averaged magnitude response output of a mel scale filter bank.

In the present embodiment, a mel spaced filter bank 69 having sixteen bands is used. The mel scale is well known in the art of speech analysis, and is a logarithmic scale that attempts to map the perceived frequency of a tone onto a linear scale. FIG. 12 shows the output $|S^k(f')|$ of the mel spaced filter bank 69, when the samples shown in FIG. 11 are passed through the bank 69. The resulting envelope 100 of the magnitude spectrum is considerably smoother due to the averaging effect of the filter bank 69, although less so at the lower frequencies due to the logarithmic spacing of the filter bank.

The formant related information is then extracted from the speech using blocks 71, 73, 75 and 77 of FIG. 10, by a process which will now be explained.

It is possible to model the speech signal S(t) of a user in terms of an excitation signal E(t) and a filter V(t), where the excitation signal E(t) represents the airflow entering the vocal tract, and the filter V(t) represents the filtration effect of the vocal tract. Consequently, the magnitude of the frequency spectrum $|S(f)|$ of the speech signal is given by the multiplication of the magnitude of the frequency spectrum $|E(f)|$ of the excitation signal with the magnitude of the spectrum $|V(f)|$ of the vocal tract filter, i.e.

$$|S(f)|=|E(f)|\cdot|V(f)| \quad (7)$$

One method, known as the cepstral method, of extracting the vocal tract information from the input speech will now be described. This method involves separating the vocal tract filter magnitude response $|V(f)|$ from the excitation magnitude response $|E(f)|$ by taking the logarithm of the speech magnitude response $|S(f)|$, which results in the excitation and vocal tract filter characteristics becoming additive, i.e.

$$\log|S(f)|=\log|E(f)|+\log|V(f)| \quad (8)$$

Figure 13:
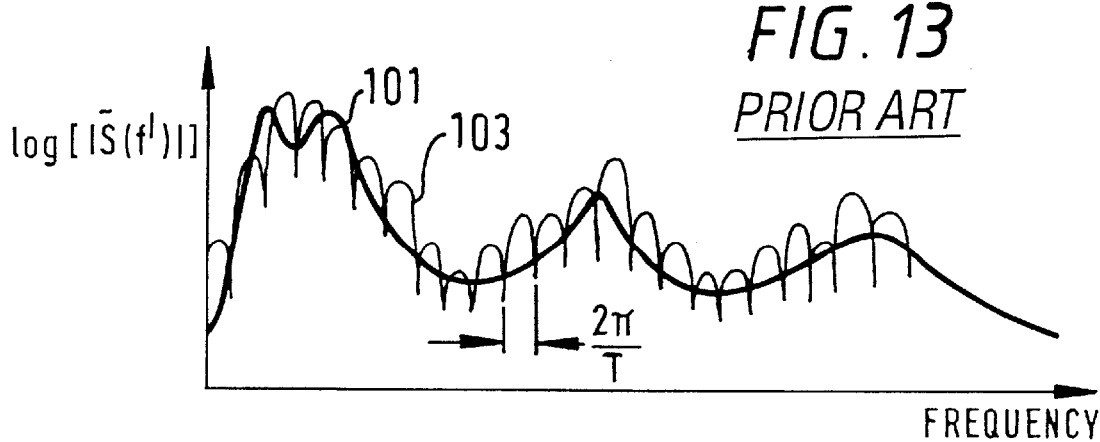
FIG. 13 is a diagrammatical representation of the log magnitude spectrum of the output from the mel scale filter bank.

FIG. 13 shows the envelope of the logged output from the mel filter bank 69, i.e. log $|S^k(f')|$, which shows graphically the additive nature of two components 101 and 103. Component 101 is representative of the vocal tract characteristics, i.e. log $|V(f)|$, and component 103 is representative of the excitation characteristics, i.e. log $|E(f)|$. The peaks in component 101 occur at the formant frequencies of the vocal tract and the equally spaced peaks in component 103 occur at the harmonic frequencies of the pitch of the speaker.

The vocal tract characteristics 101 can be extracted from the excitation characteristics 103, by performing a Discrete Cosine Transform (DCT) on the samples output from block 71, and then filtering the result. However, before performing the DCT, a dynamic noise masking is performed by the noise masking block 73.

NOISE MASKING

Figure 14:
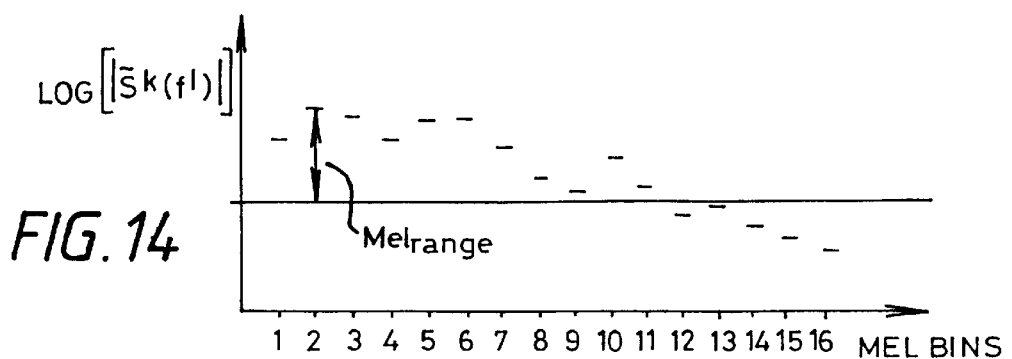
FIG. 14 is a diagrammatical representation illustrating the way in which the energy within the input frame is spread over the mel frequency banks.

The noise masking block 73 performs a dynamic masking on each frame by firstly calculating the maximum log filter-bank energy output from the mel filter banks 69. FIG. 14 illustrates the log filter bank energy for an example frame. The first step simply involves determining which frequency bank outputs the largest coefficient. In this example, this is the second filter bank and its value is stored as $mel_{max}$. The noise masking block 73 then determines a minimum log filter bank energy, $mel_{min}$, by subtracting a predefined range ($mel_{range}$), empirically found from training speech, from the maximum log filter bank energy determined for the current frame, i.e. the noise masking block 73 determines:

$$mel_{min} = mel_{max} - mel_{range} \qquad (9)$$

Finally, the noise masking block 73 makes any mel filter bank energies which are below $mel_{min}$ equal to $mel_{min}$. The reason for and the advantages of this dynamic noise masking will now be explained with reference to FIG. 15.

Figure 15A:
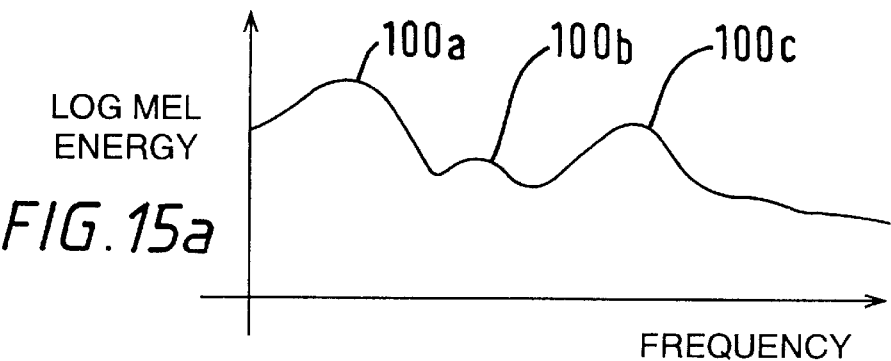
FIG. 15a is a plot of the log magnitude spectrum of the output from the mel scale filter bank for an example word when there is little background noise.
Figure 15B:
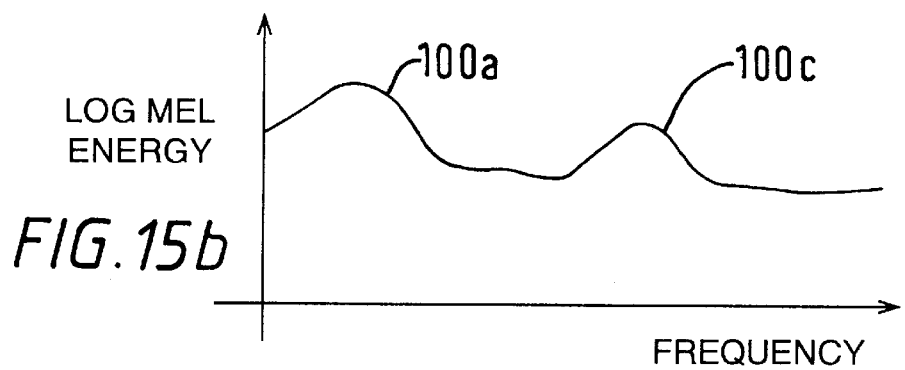
FIG. 15b is a plot of the log magnitude spectrum of the output from the mel scale filter bank for the same word when there is high levels of background noise.
Figure 15C:
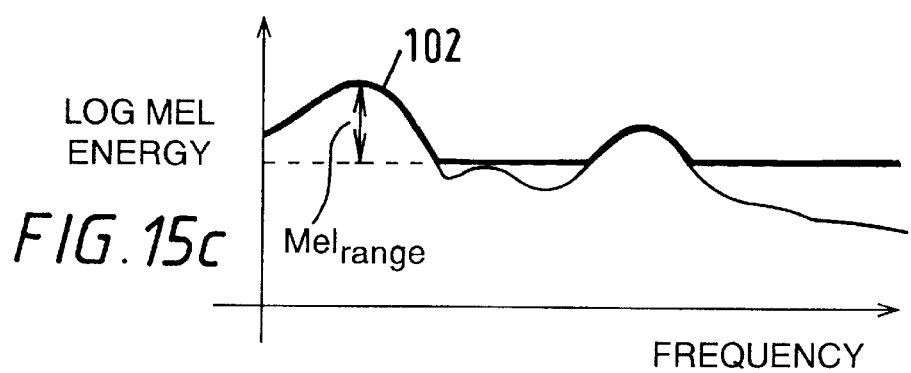
FIG. 15c shows the plot shown in FIG. 15a when a noise masking level is applied to the output from the mel scale filter bank.
Figure 15D:
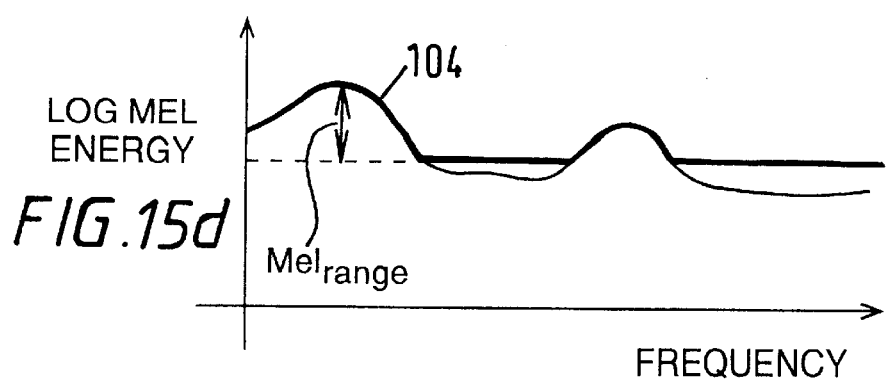
FIG. 15d shows the plot shown in FIG. 15b when the same noise masking is performed to the output from the mel scale filter bank.

FIG. 15a shows the log mel filter bank energy of an example frame in which there is little noise. As shown, the log mel energy has three peaks 100a, 100b and 100c spaced out along the frequency axis. FIG. 15b shows the log mel energy for the same frame when there is high levels of background noise. As shown, in high levels of noise, the peak 100b is smothered by the noise and the output only has peaks 100a and 100c. If these two signals were to be compared in order to try to match one with the other, then even though they are representative of the same speech signal, because of the additional noise in the FIG. 15b signal, a misrecognition could be made. However, by defining a noise floor with reference to the peak log filter bank energy of the respective frame, it is possible to reduce such misrecognition errors since peaks in the log filter bank energy which may be close to the noise floor (and hence corrupted by it) are automatically masked out and not taken into consideration during the matching process. This is illustrated in FIGS. 15c and 15d, which show the log filter bank energies shown in FIGS. 15a and 15b respectively when the dynamic noise masking of the present embodiment is performed. As shown by the bold profiles 102 and 104, with the noise masking, the signals output correspond more closely even though one includes a lot more noise.

The concept of noise masking is not new. However, in the systems proposed to date, a constant masking level is applied to each frame and is calculated relative to the noise floor. This can be done if the amplification and scaling applied to each frame is the same or if the amount of amplification and scaling of each frame is monitored so that the same level of masking can be performed on each frame. However, this is difficult to do in systems which employ an automatic gain controller (AGC) at the input, which applies a different gain to each frame of the input speech, since the gain applied by the AGC is not known. With the dynamic noise masking of the present embodiment, which performs a different masking for each frame in the manner described above, it does not matter what gains have been applied to each frame, since the masking level is determined relative to the frame maximum.

Returning to FIG. 10, after the log filter bank energies have been masked by the noise masking block 73, a discrete cosine transform (DCT) is performed in block 75. In this embodiment, since there are sixteen mel filter bank energies, a fast cosine transform is actually used in this embodiment in the DCT block 75, since this provides some speed improvements over the standard DCT.

Figure 16:
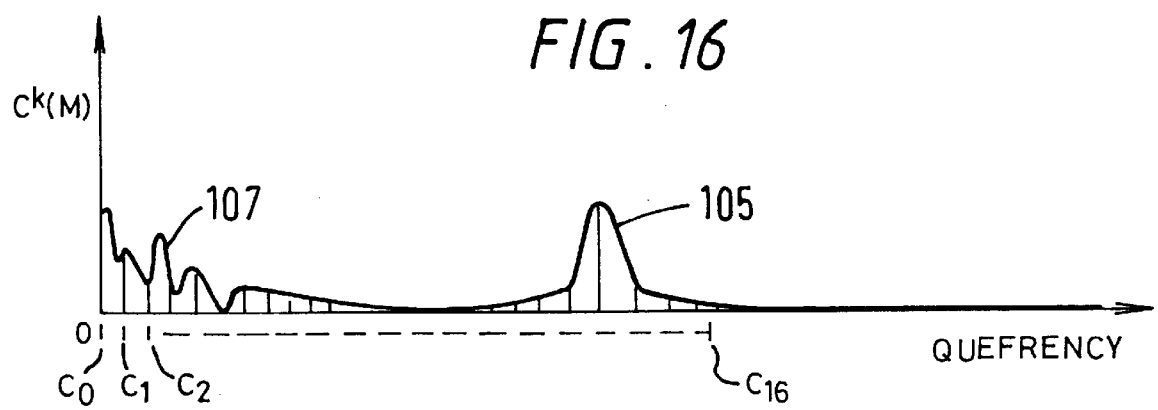
FIG. 16 is a diagrammatical representation of the cepstrum of the logged magnitude spectrum shown in FIG. 13.

FIG. 16 shows the output of the block 75, which is known as the cepstrum $C^k(m)$. The independent variable (x-axis of FIG. 16) of the cepstrum has dimensions of time and is given the name "quefrency". The strongly periodic component 103 shown in FIG. 13 becomes a peak 105 in the cepstrum at a location equivalent to the pitch period T of the speaker. The slowly varying component 101 shown in FIG. 13, is transformed onto a number of small peaks 107 near the origin of the cepstrum, the positions and amplitudes of which are dependent on the formants.

As the vocal tract characteristics and the excitation characteristics of speech appear in separate parts of the quefrency scale, they can be separated from one another by a filtering process, or, in cepstral terminology by a so called "liftering" process. The cepstrum $C^k(m)$ shown in FIG. 16 is made up of a set of discrete cepstral coefficients ($C_0, C_1, \ldots C_{15}$), and therefore the liftering could be achieved by means of a simple rectangular window. However, in order to de-emphasise parts of the spectrum that are considered to be less reliable, a more gradual windowing function is preferred.

In the present embodiment, the following window function is used in liftering block 77:

$$W_{lift}(m) = \frac{1}{3}\left(1 + 6\sin\frac{\pi m}{12}\right) \qquad (10)$$

In this embodiment, the first nine cepstral coefficients are calculated, since the remaining coefficients have negligible effect on speech recognition performance. (In a speaker verification system, however, the coefficients around the peak 103 would be used, since the pitch of a speaker is characteristic of the speaker.)

The coefficients output from the liftering block 77 are each represented by a 16 bit binary number. In order to reduce the amount of memory required, both to store the reference models and to store the coefficients during recognition processing, the number of bits for each cepstral coefficient is reduced to eight. This could be achieved by simply resealing each binary number. However, the applicant has identified that the cepstral coefficients are found to be clustered around a mean value, with occasional outliers and such resealing would therefore result in most of the cepstral coefficients being clustered close to zero.

Figure 17:
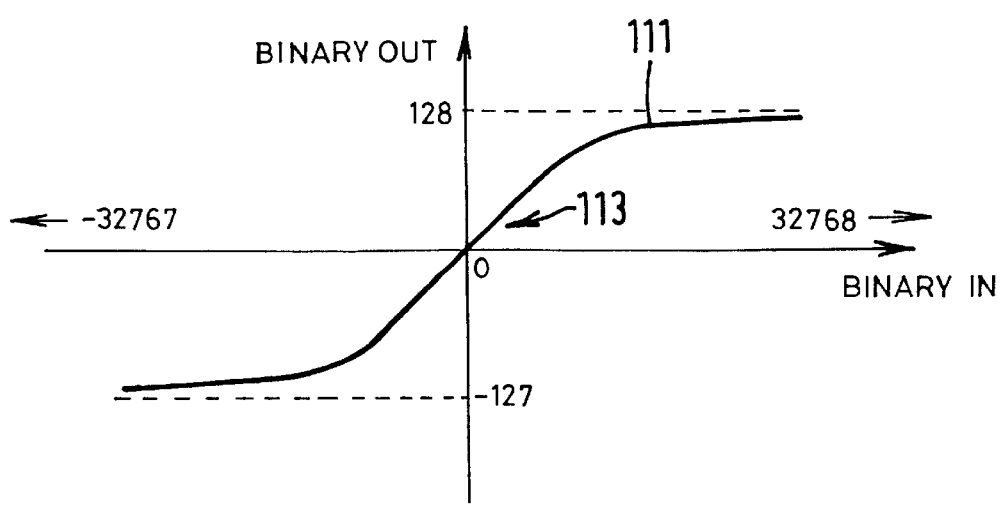
FIG. 17 is a plot illustrating a non-linear transformation used for scaling the binary values representative of the cepstral coefficients in order to reduce the number of bits used to represent them.

Therefore, in this embodiment, a non-linear transformation is performed by the bit transformation unit 79 shown in FIG. 10. FIG. 17 shows the non-linear transform which is applied in this embodiment. In particular, the X-axis defines the input sixteen bit binary value and the Y-axis defines the corresponding eight bit value obtained from the non-linear sigmoid function represented by the curve 111. As can be seen from FIG. 17, the sigmoid function 111 has a portion 113 around zero which is substantially linear. This corresponds to the area in which most of the cepstral coefficients are to be found. Therefore, the non-linear sigmoid function shown in FIG. 17 effectively increases the resolution available for the majority of the cepstral coefficients which lie away from the extreme values, while also preventing the extremes from overflowing.

ENERGY NORMALIZATION

In addition to the nine cepstral coefficients mentioned above, the average energy of the speech signal within each frame is also used as a recognition feature for each input frame. Energy is an important feature since it can be used, among other things, to indicate whether or not the input speech signal during the frame corresponds to a voiced speech signal. As described above, the frame energy of each input frame is calculated in the energy calculation unit 76 and stored in buffer 78 shown in FIG. 7. The energy for the current frame output by the buffer 78 is then normalised by the normalising block 83 in order to remove the variation caused by variable recording conditions.

FIGS. 18a and 18b illustrate the types of energy variations which can affect the recognition accuracy. In particular, FIGS. 18a and 18b show, schematically, the energy levels in two utterances of the same word. The first utterance 121, shown in FIG. 18a, is a loud utterance with low background noise and the second 123, shown in FIG. 18b, is a quieter utterance with more background noise. Simply using the energy calculated for each utterance by the energy calculation unit 76 as a recognition feature would show a significant mismatch between the two utterances. Normalising so that the peak energy in both utterances is the same would remove the mismatch in the louder portions, but would increase the mismatch between the quieter portions of the utterance. In order to overcome this problem, in this embodiment, an energy masking step (similar to the noise masking technique described above) is performed which replaces all energy values that lie more than a fixed amount below the maximum with that value below the maximum. This is illustrated in FIG. 18c, which shows both the energy levels of the utterances 121 and 123 shown in FIGS. 18a and 18b after maximum normalization and also shows the resulting energy level 125 after energy masking with a constant masking depth 127 which is set in advance and which is found empirically from training data.

One problem with this technique is that the maximum energy for each utterance is not known until the whole utterance has been received. This causes a problem when the input speech is processed incrementally, i.e. when it is processed as it is received without waiting until the end of the utterance. However, this problem can be overcome, since the maximum energy within an utterance is normally observed within a few frames of the onset of speech. Therefore, because the speech detection algorithm described above only confirms the start of speech some time after speech has actually started, it is therefore likely that the maximum energy has been encountered by the stage at which energy normalization is first required. The following approach to estimating the maximum energy therefore proves satisfactory:

i) delay energy normalization until the start of speech has been confirmed and the recognition search is about to begin;

ii) assume that the maximum energy is at least the masking depth 127 greater than the silence energy;

iii) calculate the maximum of all the speech frames so far; and iv) perform maximum normalization using the greater of the maximum energy identified in (iii) and the silence energy plus the masking depth, but, in incremental processing, delay the above processing for three frames.

After the above energy normalization has been performed on each frame energy, the energy term is rescaled by an empirically chosen factor which suitably weights the energy contribution to the recognition scores.

In summary, the preprocessor 15 continuously monitors the input signal and when it identifies the beginning of speech, it starts a feature extraction routine which extracts nine cepstral coefficients and one energy coefficient for each frame of input speech. The coefficient vectors or feature vectors output by the preprocessor are then compared with stored reference models which model the words already known to the system and the acoustic environment surrounding the system. Each model associated with a particular word comprises a sequence of feature vectors of the same type output by the preprocessor described above.

TRAINING

A brief description of the way in which the word models described above are generated will now be given. For a more detailed description, the reader is referred to the Applicant's earlier European application EP 0789349 mentioned above.

The purpose of the training is to generate a representative model for each word to be used by the system. The input to the training process is multiple training examples for the word. Each example is represented by a series of feature vectors extracted by the feature extractor discussed above. The training process can generate a word model from just two training examples, although three examples produces slightly more accurate word models. There is very little improvement from using further training examples.

The training algorithm firstly takes two examples as the inputs to generate a first word model. If more than two examples are to be used to train the word, it then generates a second word model from the first model and a further training example. The iteration continues until a required number of examples have been used. The word model finally generated is stored as the representative model for the word. In either case, the core part of the training algorithm operates to generate a word model from just two examples.

The first step in training is to align the two sequences of feature vectors for the two examples. This alignment process is performed using a flexible programming alignment process which does not constrain where the optimum alignment path between the words must begin or end. This flexible dynamic alignment process is described in detail in the Applicant's earlier European application mentioned above, and will not be described again here.

FIG. 19a illustrates the results of such a flexible dynamic programming alignment process between two training examples 151 and 153. As shown in FIG. 19a, training example 151 has portions 151-1a and 151-1b which correspond to silence or background noise and a speech containing portion 151-2. Similarly, the second training example 153 also has portions 153-1a and 153-1b at the beginning and end thereof corresponding to silence or background noise and a speech containing portion 153-2. The alignment process causes the noise frames at the beginning and end of each training example 151 and 153 to be matched with a silence or noise model 155 and the speech portions 151-2 and 153-2 to be aligned with each other. The word model for the speech is then generated by averaging the frames within the portion 151-2 and 153-2 which are aligned with each other. However, the above processing can cause errors in the word model, especially if the training examples are not consistent. In this embodiment, a consistency check is performed to ensure that only consistent training examples are used to generate a word model.

CONSISTENCY CHECKING

The consistency check performed in this embodiment, is designed to spot inconsistencies between the examples which might arise for a number of reasons. For example, when the user is inputting a training example, he might accidentally breath heavily into the microphone at the beginning of the training example. This possibility is shown in FIG. 19b which shows large oscillations 156 at the beginning utterance 157. Alternatively, the user may simply input the wrong word. This is illustrated in FIG. 19c where the speech portion 159 is clearly different to the speech portions in signals 151 and 153. Another possibility is that the user inputs only part of the training word or, for some reason, part of the word is cut off. This is illustrated in FIG. 19d, which shows that the first part 161 of the training word is input, but not the second part. Finally, during the input of the training example, a large increase in the background noise might be experienced which would corrupt the training example. This is illustrated in FIG. 19e which shows the training word with a portion of background noise 163 in the middle of the training word.

The present embodiment checks to see if the two training examples are found to be consistent, and if they are, then they are used to generate a model for the word being trained. If they are inconsistent, then the following rules apply:

i) If one example is already a word model (formed by two or more previous training examples) then the other example is discard d an extra example is required.

ii) If both the examples are directly from the feature extractor, then both the examples are stored but no model generation is performed. The system will call for another example. If the third example is consistent with one of the stored examples, this consistent pair of examples will be used to generate a word model and the other example will be discarded.

iii) If the third example is not consistent with either of the stored examples, the first example is discarded and the second example and the third example are re-labelled as the first and second examples. The system then waits for another example.

A count is made of the number of inconsistencies found for each word that is trained. If the number of inconsistencies exceeds a fixed maximum, then all further inconsistency checking is turned off. This prevents the possibility of the system getting stuck in an infinite loop.

The consistency test used in the present embodiment will now be described. Firstly, the system determines the average frame score ($\bar{f}$) for the frames in the two training examples which are aligned with each other, but not including scores from the silence portions. This is calculated by dividing the dynamic programming score for the aligned frames with the number of aligned frames. The system then determines the score of the worst matching ten consecutive frames (w) within the aligned speech portions. These values are then compared with a model which models how these two values ($\bar{f}$ and w) vary in consistent utterances and provided these values for the current training examples agree with the model, then the two training examples are taken to be consistent.

The model which is used is determined by considering the statistics of these two values ($\bar{f}$ and w) for a large set of training examples which are known to be consistent. The model might simply be the averages of these two values. However, in this embodiment, a bi-variate Gaussian model is used to model the average of the variation between and the correlation between these two values found in the consistent examples. Two training utterances are then deemed to be consistent if the statistics for their training alignment (i.e. $\bar{f}$ and w) lie within the 95% probability contour of this bi-variate Gaussian model or if $\bar{f}$ and w for the two training examples are both less than the expected values for $\bar{f}$ and w defined by the model.

After a pair of training examples are deemed to be consistent, the statistics ($\bar{f}$ and w) for those training examples can be used to update the stored model for consistent utterances. This can be done using a maximum likelihood estimation technique.

After the system has been trained, the speech recognition system can then compare the input utterance from a user with the stored word models in order to provide a recognition result. The way in which such a speech recognition result can be provided is described in the Applicant's earlier European application mentioned above and will not be described here.

As those skilled in the art will appreciate, the above speech processing and consistency checking have been described in the context of a speech recognition system and they are equally applicable in other speech processing systems, such as speaker verification systems.

What is claimed is:

1. A speech processing apparatus comprising:
   means for receiving an input speech signal;
   means for dividing the received speech signal into a number of successive time frames;
   means for determining the frame energy distribution of energy with frequency within each of said time frames;
   means for determining the maximum energy level within the current time frame of the determined frame energy distribution, wherein the maximum energy level is denoted by $mel_{max}$;
   means for storing a predetermined energy level denoted by $mel_{range}$;
   means for determining a minimum energy level for the current time frame of the determined frame energy distribution, wherein the determined minimum energy level is denoted by $mel_{min}$ and is determined by the following formula:

$$mel_{min} = mel_{max} - mel_{predetermined}; \text{ and}$$

means for changing the determined frame energy distribution for the current time frame by setting any energy levels which are below $mel_{min}$ to equal $mel_{min}$.

2. An apparatus according to claim 1, wherein said means for determining the frame energy distribution within each frame comprises Fourier transform means for performing a Fourier transform of the signal within each time frame.

3. An apparatus according to claim 1, wherein said frame energy distribution determing means comprises means for averging the energy within a plurality of discrete frequency bands of each frame, and wherein said means for determing said maximum energy level is operable to identify the frequency band with the largest averaged energy level.

4. An apparatus according to claim 3, wherein said frequency bands are logarithmically spaced apart from each other.

5. An apparatus according to claim 3, wherein said frame energy distribution determining means comprises logarithm means for determining the logarithm of the averaged energy distribution of each of said frequency bands.

6. A speech processing method comprising the steps of:
   receiving an input speech signal;
   dividing the received speech signal into a number of successive time frames;
   determining the frame energy distribution of energy with frequency within each of said time frames; and
   processing each frame energy distribution by:
   (i) determining the maximum energy level within the current time frame of the determined frame energy distribution, wherein the maximum energy level is denoted by $mel_{max}$;

(ii) storing a predetermined energy level denoted by $mel_{range}$;

(iii) determining a minimum energy level for the current time frame of the determined frame energy distribution, wherein the determined minimum energy level is denoted by $mel_{min}$ and is determined by the following formula:

$$mel_{min} = mel_{max} - mel_{predetermined};\text{ and}$$

(vi) changing the determined frame energy distribution for the current time frame by setting any energy levels which are below $mel_{min}$ to equal $mel_{min}$.

7. A method according to claim 6, wherein said determining step for determining the frame distribution energy performs a Fourier transform of the signal within each time frame.

8. A method according to claim 6, wherein said frame energy distribution determining step comprises the step of averaging the energy within a plurality of discrete frequency bands of each frame, and wherein said step for determining said maximum energy level determines said maximum energy level by identifying the frequency band with the largest averaged energy level.

9. A method according to claim 8, wherein said frequency bands are logarithmically spaced apart from each other.

10. A method according to claim 8, wherein said frame energy distribution determining step comprises the step of:

calculating a logarithm of the averaged energy level of each of said frequency bands.

11. A computer readable medium storing computer executable process steps for controlling a processor to implement a speech processing method, the process steps comprising:

a step of receiving an input speech signal;

a step of dividing the received speech signal into a number of successive time frames;

a step of determining the frame energy distribution of energy with frequency within each of said time frames; and a step of processing each frame energy distribution by:
(i) determining the maximum energy level within the current time frame of the determined frame energy distribution, wherein the maximum energy level is denoted by $mel_{max}$;
(ii) storing a predetermined energy level denoted by $mel_{range}$;
(iii) determining a minimum energy level for the current time frame of the determined frame energy distribution, wherein the determined minimum energy level is denoted by $mel_{min}$ and is determined by the following formula:

$$mel_{min} = mel_{max} - mel_{range};\text{ and}$$

(vi) changing the determined frame energy distribution for the current time frame by setting any energy levels which are below $mel_{min}$ to equal $mel_{min}$.

12. A computer readable medium according to claim 11, wherein said determining step for determining the frame distribution energy performs a Fourier transform of the signal within each time frame.

13. A computer readable medium according to claim 11, wherein said frame energy distribution determining step comprises the step of averaging the energy within a plurality of discrete frequency bands of each frame, and wherein said step for determining said maximum energy level determines said maximum energy level by identifying the frequency band with the largest averaged energy level.

14. A computer readable medium according to claim 13, wherein said frequency bands are logarithmically spaced apart from each other.

15. A computer readable medium according to claim 13, wherein said frame energy distribution determining step comprises the step of calculating a logarithm of the averaged energy level of each of said frequency bands.

16. Processor implementable process steps for controlling a processor to implement a speech processing method, the process steps comprising:

a step of receiving an input speech signal;

a step of dividing the received speech signal into a number of successive time frames;

a step of determining the frame energy distribution of energy with frequency within each of said time frames; and a step of processing each frame energy distribution by:
(i) determining the maximum energy level within the current time frame of the determined frame energy distribution, wherein the maximum energy level is denoted by $mel_{max}$;
(ii) storing a predetermined energy level denoted by $mel_{range}$;
(iii) determining a minimum energy level for the current time frame of the determined frame energy distribution, wherein the determined minimum energy level is denoted by $mel_{min}$ and is determined by the following formula:

$$mel_{min} = mel_{max} - mel_{range};\text{ and}$$

(vi) changing the determined frame energy distribution for the current time frame by setting any energy levels which are below $mel_{min}$ to equal $mel_{min}$.

17. Computer executable process steps according to claim 16, wherein said determining step for determining the frame distribution energy performs a Fourier transform of the signal within each time frame.

18. Computer executable process steps according to claim 16, wherein said frame energy distribution determining step comprises the step of averaging the energy within a plurality of discrete frequency bands of each frame, and wherein said step for determining said maximum energy level determines said maximum energy level by identifying the frequency band with the largest averaged energy level.

19. Computer executable process steps according to claim 18, wherein said frequency bands are logarithmically spaced apart from each other.

20. Computer executable process steps according to claim 18, wherein said frame energy distribution determining step comprises the step of calculating a logarithm of the averaged energy level of each of said frequency bands.

21. A speech processing apparatus comprising:

a receiver configured to receive an input speech signal;

a divider, connected to the receiver, configured to divide the received speech signal into a number of successive time frames;

a determining circuit, connected to the divider, configured to determine the frame energy distribution of energy with frequency within each of the time frames; and a processor, connected to said determining circuit, configured to process each frame energy distribution comprising:
  (i) determining the maximum energy level within the current time frame of the determined frame energy distribution, wherein the maximum energy level is denoted by $mel_{max}$;
  (ii) storing a predetermined energy level denoted by $mel_{range}$;
  (iii) determining a minimum energy level for the current time frame of the determined frame energy distribution, wherein the determined minimum energy level is denoted by $mel_{min}$ and is determined by the following formula:

$$mel_{min} = mel_{max} - mel_{range};\ \text{and}$$

(vi) changing the determined frame energy distribution for the current time frame by setting any energy levels which are below $mel_{min}$ to equal $mel_{min}$.

22. An apparatus according to claim 21, wherein said determining circuit is configured to perform a Fourier transform of the signal within each time frame.

23. An apparatus according to claim 21, wherein said determining circuit comprises an averaging circuit configured to determine the average energy within a plurality of discrete frequency bands of each frame and wherein said processor is connected to said averaging circuit and is configured to determine said maximum energy level by identifying the frequency band with the largest averaged energy level.

24. An apparatus according to claim 23, wherein said averaging circuit is configured to determine the average energy within a plurality of discrete frequency bands which are logarithmically spaced apart from each other.

25. An apparatus according to claim 23, wherein said determining circuit comprises a logarithm circuit connected to said averaging circuit, which is configured to calculate a logarithm of the averaged energy level of each of said frequency bands.

26. An apparatus according to claim 21, further comprising a memory storing one or more user models and a recognition processor for comparing the changed frame energy distribution with said one or more user models to provide a recognition result.

27. A speech processing apparatus according to claim 1, further comprising a memory for storing one or more user models and a recognition processor for comparing the changed frame energy distribution changed by said changing means with the one or more user models to provide a recognition result.

28. A speech processing method according to claim 6, further comprising steps for storing one or more user models and the step of comparing the changed frame energy distribution with said one or more user models to provide a recognition result.

29. A speech processing method according to claim 6, further comprising steps for comparing the changed frame energy distribution with one or more user models stored in a memory to provide a recognition result.

* * * * *

UNITED STATES PATENT AND TRADEMARK OFFICE
CERTIFICATE OF CORRECTION

PATENT NO. : 6,411,925 B1
DATED : June 25, 2001
INVENTOR(S) : Robert Alexander Keiller It is certified that error appears in the above-identified patent and that said Letters Patent is hereby corrected as shown below:

Title page,
Item [75], Inventor, "Robert Alexander Keiller, Guildford" should read
-- Robert Alexander Keiller, Surrey --.
Item [30], Foreign Application Priority Data, "Oct. 20, 1998 (GB) ….. 9822930" should read -- Oct. 20, 1998 (GB) ….. 9822930.5 --.

Column 1,
Line 21, "performed on" should read -- performed. --.
Line 35, "equal" should read -- or equal --.

Column 2,
Line 20, "is" should read -- are --.

Column 3,
Line 9, "example" should read -- example, --.
Line 11, "internet" should read -- Internet --.
Line 16, "Applicant's" should read -- Inventor's --.

Column 4,
Line 8, "this." should read -- this --.
Line 57, "process" should read -- processes --.

Column 5,
Line 11, close up the left margin.
Line 12, close up the right margin.
Line 37, "is" should read -- are --.
Line 60, "a" should read -- an --.
Line 66, "of" should read -- of a --.

Column 6,
Line 21, "threshold. Depending" should read -- threshold. ¶ Depending --.

UNITED STATES PATENT AND TRADEMARK OFFICE
CERTIFICATE OF CORRECTION

PATENT NO.   : 6,411,925 B1
DATED        : June 25, 2001
INVENTOR(S)  : Robert Alexander Keiller It is certified that error appears in the above-identified patent and that said Letters Patent is hereby corrected as shown below:

<u>Column 7,</u>
Line 11, "the" should be deleted.

<u>Column 9,</u>
Line 32, "a" should read -- σ --.

<u>Column 10,</u>
Line 27, "$|S^k(f')|$" should read -- $|S^k(f')|$ --.
Line 59, "$|S^k(f')|$," should read -- $|S^k(f')|$, --.

<u>Column 11,</u>
Line 32, "is" should read -- are --.

<u>Column 12,</u>
Line 20, "so called" should read -- so-called --.

<u>Column 13,</u>
Line 28, "both the" should read -- both --.

<u>Column 14,</u>
Lines 14 and 40, "Applicant's" should read -- Inventor's --.
Line 22, "produces" should read -- produce --.
Line 56, "portion" should read -- portions --.

<u>Column 15,</u>
Line 1, "be" should read -- they --.
Line 2, "breath" should read -- breathe --.
Line 23, "discard d" should read -- discarded and --.
Lines 24 and 25, "both the" should read -- both --.
Line 51, "provided" should read -- providing --.

UNITED STATES PATENT AND TRADEMARK OFFICE
CERTIFICATE OF CORRECTION

PATENT NO. : 6,411,925 B1
DATED : June 25, 2001
INVENTOR(S) : Robert Alexander Keiller It is certified that error appears in the above-identified patent and that said Letters Patent is hereby corrected as shown below:

<u>Column 16,</u>
Line 9, "Applicant's" should read -- Inventor's --.

Signed and Sealed this

Twenty-second Day of April, 2003

JAMES E. ROGAN
*Director of the United States Patent and Trademark Office*